UNITED STATES PATENT OFFICE.

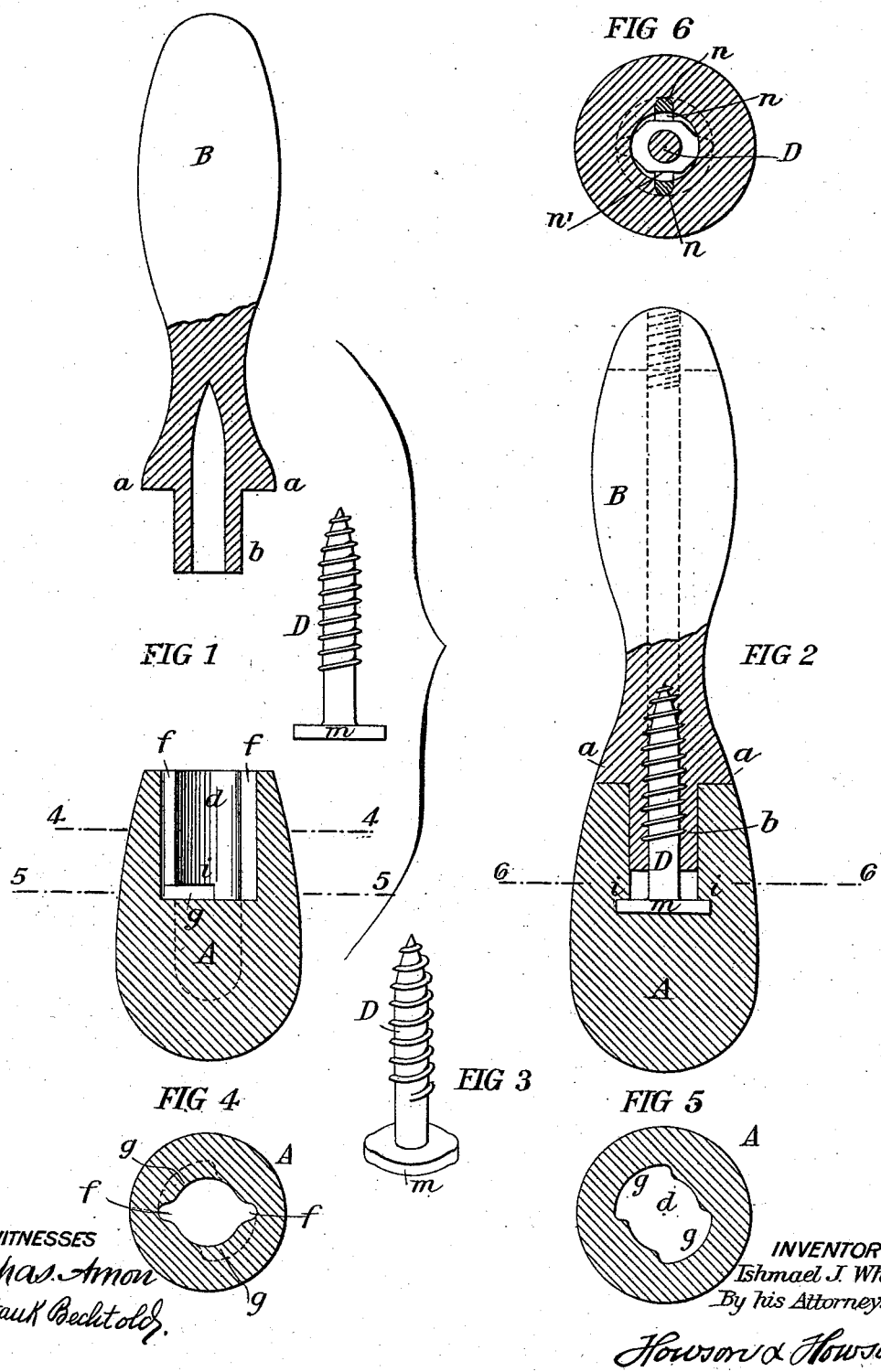
(No Model.)
I. J. WHITE.
PESTLE.
No. 537,328. Patented Apr. 9, 1895.
INVENTOR
Ishmael J. White
By his Attorneys
Howson & Howson
WITNESSES
Chas. Amon
Frank Bechtold

ISHMAEL JAMES WHITE, OF PHILADELPHIA, PENNSYLVANIA.

PESTLE.

SPECIFICATION forming part of Letters Patent No. 537,328, dated April 9, 1895.

Application filed March 28, 1894. Serial No. 505,388. (No model.)

*To all whom it may concern:*

Be it known that I, ISHMAEL JAMES WHITE, a citizen of the United States, residing in Philadelphia, Pennsylvania, have invented certain Improvements in Pestles, of which the following is a specification.

The object of my invention is to so secure a wooden or other handle to the wedge-wood head of a druggist's pestle that the same can be readily applied or removed, and will not be loosened or otherwise affected by heat or by acid or other compounds in the preparation of which the pestle is used, the construction, moreover, being of a cheap and simple character.

In the accompanying drawings, Figure 1, is a view showing the pestle head, handle and attaching device separated from each other, the pestle head and part of the handle being shown in section and the attaching device in elevation. Fig. 2, is a similar view but showing the parts secured together. Fig. 3, is a perspective view of the attaching device. Figs. 4 and 5, are sectional plan views of the pestle head taken respectively on the lines 4—4, and 5—5, Fig. 1; and Fig. 6, is a sectional plan view illustrating a special means of securing the attaching device in place in the pestle head.

A is the wedge-wood head of the pestle, and B is the wooden handle reduced in diameter at $a$ so as to form a shoulder for bearing upon the top of the head A, and a contracted neck $b$ for entering the central opening $d$, formed in the upper portion of the head, the latter also having, at opposite sides of the opening, recesses $f$, and at the base of the opening, recesses $g$ forming lateral continuations or enlargements of said recesses $f$ and extending beneath shoulders $i$, that portion of the head beneath the opening $d$ being either solid as shown by full lines in Figs. 1 and 2, or hollow, as shown by dotted lines in Fig. 1.

The attaching device consists of a screw D having an oblong bearing head $m$ the major axis of which is such that it can be passed down through the recesses $f$ of the head A, and when at the bottom of the opening $d$ can be turned laterally so that the projecting portions of the head will enter the recesses $g$ and engage with the shoulders $i$ above the same. The screwing of the handle B onto the threaded stem of the bolt D tends to cause the turning of the projecting portions of the head $m$ into the recesses $g$, and when the handle is firmly secured into place the said projecting portions of the head are caused to bind so firmly against the shoulders $i$ that the bolt cannot, without considerable effort, be turned backward so as to bring the projecting portions of the head again into line with the recesses $f$. Hence the accidental loosening or detaching of the handle is rendered extremely improbable, and even in such case the handle can be readily tightened again by giving it a partial turn to the right. If desired, however, the bolt D may be secured in place in the head, after having been turned so as to cause the projecting portions of the head $m$ to enter the recesses $g$, by filling the lower portion of the opening $d$ with some suitable cement, such as plaster of paris, lead, or the like, preparatory to screwing on the handle B, or other means may be adopted for securing the bolt D in place after insertion, for instance, in Fig. 6 I have shown locking bars $n$ adapted to the recesses $f$ and having heads $n'$ for bearing upon the reduced sides of the bolt after the projecting portions of the same have been caused to enter the recesses $g$, said reduced sides of the bolt being flattened to prevent the bolt from turning after the heads of the locking bars engage therewith. In this case the recesses $g$ may extend completely around the opening $d$ if desired. In some cases, also, the bolt may extend completely through the handle and may be secured by a nut at the outer end of the same, as shown for instance by dotted lines in Fig. 2, and it is manifest that a single recess $f$ with inner recess $g$ may be used instead of two recesses, although the latter construction is preferred.

My invention provides an extremely cheap and convenient method of fastening the handle to the head of the pestle, the joint being unaffected by heat or by acid or other compounds in the preparation of which the pestle may be used. Hence the device is preferable to the usual plan of securing the handle to the head by means of wax, or to the other plan which has been proposed, of making the handle of hard rubber and screwing the neck of the same directly into a threaded opening formed in the head of the pestle.

Having thus described my invention, I claim and desire to secure by Letters Patent—

1. The combination of the head of the pestle having an opening with side recess enlarged at the inner end, with a handle, and a securing bolt therefor, projecting forwardly beyond the handle and having an oblong head adapted to pass through the recessed opening in the head of the pestle, and to enter the enlargement at the inner end of said opening, substantially as specified.

2. The combination of the head of the pestle having a central opening with side recess enlarged at the inner end, the handle having a contracted neck adapted to said central opening of the head, and the securing bolt projecting forwardly beyond said contracted neck of the handle and having an oblong head adapted to pass through the recessed opening of the pestle head and to enter the enlargement at the inner end of said opening, substantially as specified.

3. The combination of the head of the pestle having a central opening with side recess enlarged at the inner end, the handle, and the securing bolt projecting forwardly beyond the handle and having an oblong head adapted to pass through the recessed opening of the pestle head, and to enter the enlargement at the inner end of the same, and means for securing the head of the bolt in said opening, substantially as specified.

4. The combination of the pestle head having a central opening with side recess, a lateral recess forming a continuation or enlargement of the side recess at the inner end of the opening, the securing bolt having an oblong head adapted to pass through the side recess of the opening and to enter the lateral recess at the inner end of the same, and a handle screwed directly upon the threaded stem of said securing bolt and serving, as it is screwed up, to press the enlarged head of the bolt into the lateral recess at the inner end of the opening in the pestle head, substantially as specified.

5. The combination of the pestle head having an opening with side recess and enlarged at the inner end, the handle securing bolt, having an oblong head adapted to pass through the recessed opening of the pestle head and to enter the enlargement at the inner end of the same, and a locking bar adapted to the side recess of the opening, and having a portion for bearing upon the head of the bolt and preventing the turning of the same, substantially as specified.

In testimony whereof I have signed my name to this specification in the presence of two subscribing witnesses.

ISHMAEL JAMES WHITE.

Witnesses:
MURRAY C. BOYER,
JOSEPH H. KLEIN.